United States Patent [19]

Andersen et al.

[11] 4,137,705
[45] Feb. 6, 1979

[54] COOLING AIR COOLER FOR A GAS TURBINE ENGINE

[75] Inventors: Richard H. Andersen; Robert J. Corsmeier, both of Cincinnati; James P. Rauf, Blue Ash; Dean T. Lenahan, Cincinnati, all of Ohio

[73] Assignee: General Electric Company, Cincinnati, Ohio

[21] Appl. No.: 818,361

[22] Filed: Jul. 25, 1977

[51] Int. Cl.² .............................................. F02C 7/18
[52] U.S. Cl. .................................. 60/39.08; 60/39.66; 60/39.67; 60/39.71
[58] Field of Search ................ 60/39.08, 39.66, 39.71, 60/39.51 R, 39.07, 39.67; 165/165

[56] References Cited

U.S. PATENT DOCUMENTS

| 2,676,458 | 4/1954 | Hill | 60/39.08 |
| 2,907,527 | 10/1959 | Cummings | 60/39.66 |
| 3,078,667 | 2/1963 | Deinhardt | 60/39.08 |
| 3,191,707 | 6/1965 | Peterson | 60/39.51 R |
| 3,528,250 | 9/1970 | Johnson | 60/39.66 |
| 3,742,706 | 7/1973 | Klompas | 60/39.66 |

FOREIGN PATENT DOCUMENTS 899312  6/1962  United Kingdom .................... 60/39.66

Primary Examiner—Robert E. Garrett
Attorney, Agent, or Firm—Robert C. Lampe, Jr.; Derek P. Lawrence

[57] ABSTRACT

A gas turbine engine having a compressor and an air-cooled turbine is provided with a cooling system for decreasing the temperature of the turbine cooling air. A compact heat exchanger, rotatable with the compressor, receives a portion of the pressurized air which is bled from the compressor. Relatively cool engine lubrication oil is pumped through the heat exchanger into heat exchange relationship with the pressurized air, thereby cooling the air and heating the lubrication oil. The cooled air is then routed to and circulated through the turbine blades to provide improved internal cooling thereof. The heated lubrication oil is collected from the heat exchanger and routed to a second heat exchanger wherein it is placed in heat exchange relationship with engine fuel to recover the heat extracted from the compressor bleed air and to return the heat to the engine operating cycle. The cooling system is designed to contain the lubricant in the unlikely event of a leak developing in the heat exchanger. Incorporation of the heat exchanger of the present invention into a gas turbine engine permits a reduction in the quantity of compressor air required for turbine rotor blade cooling and, thus, provides an improvement in engine performance.

9 Claims, 5 Drawing Figures

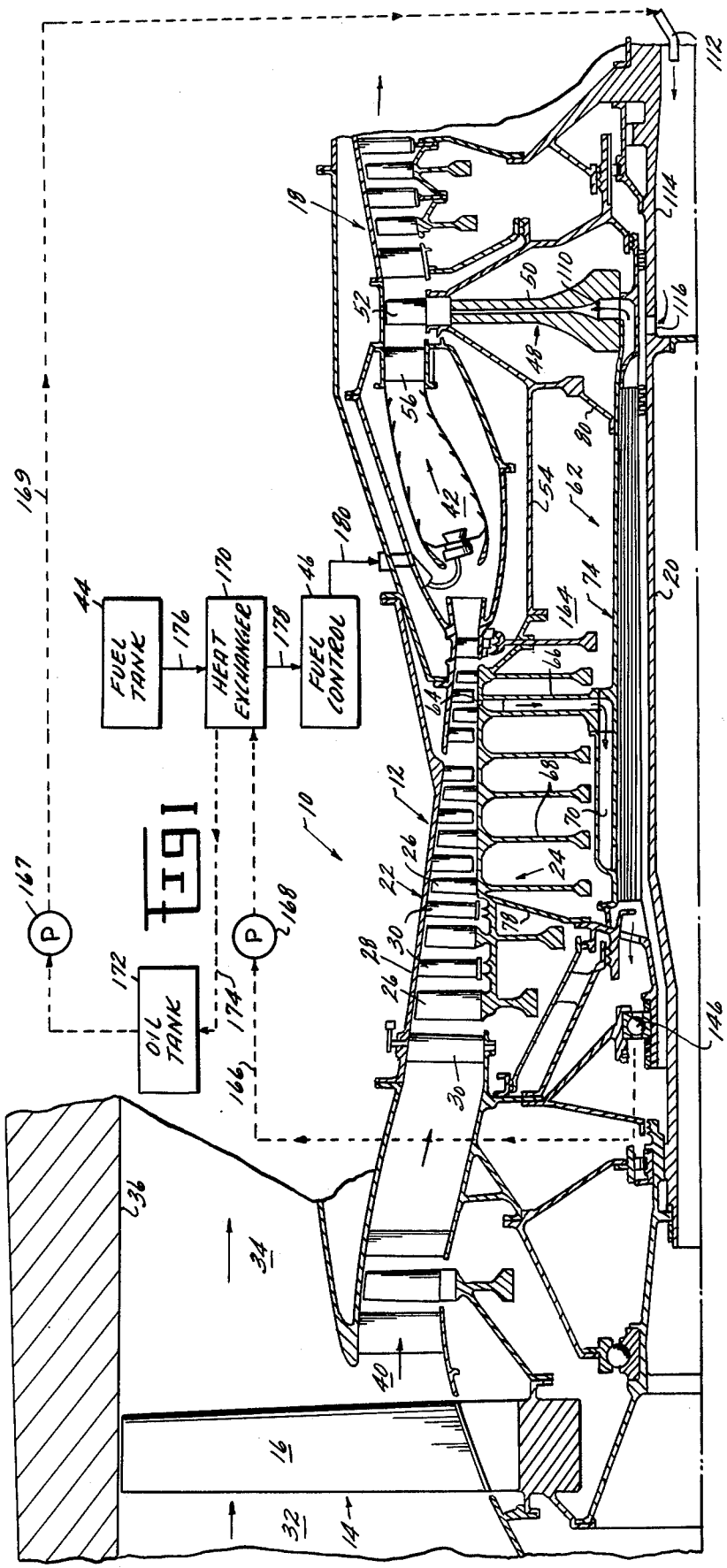

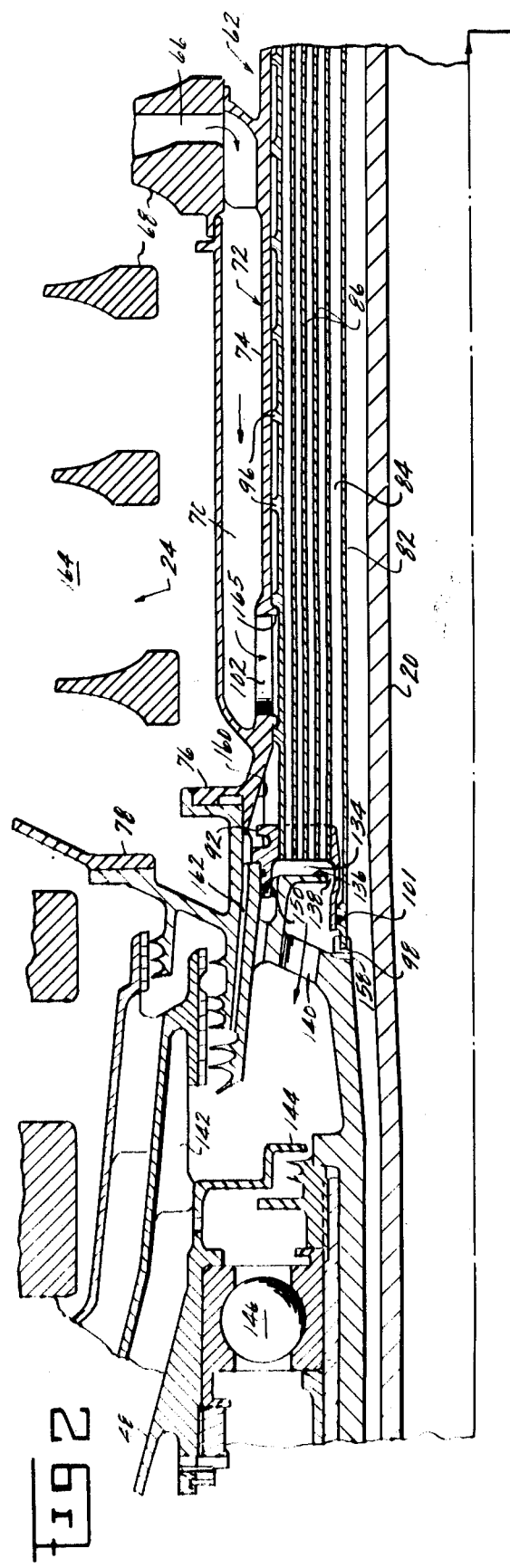

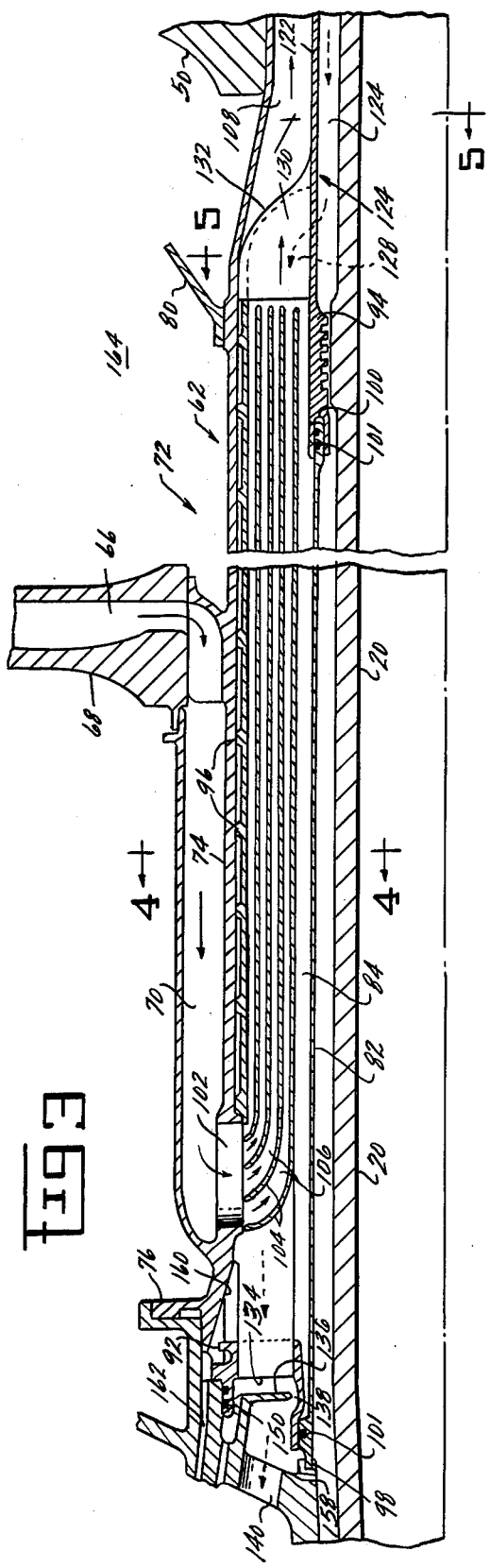
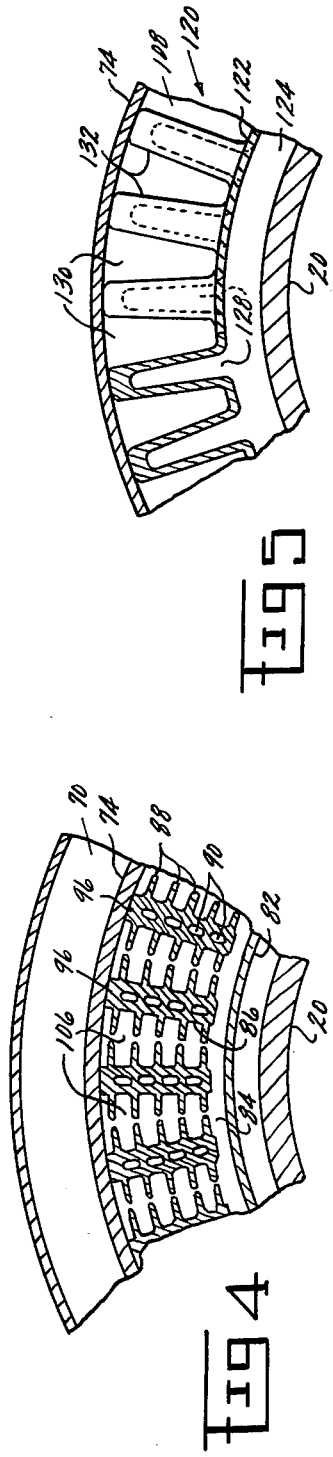

COOLING AIR COOLER FOR A GAS TURBINE ENGINE

BACKGROUND OF THE INVENTION

This invention relates to gas turbines and, more particularly, to a concept for efficiently reducing the temperature of air used to cool high temperature turbine rotor blades.

It is well understood that gas turbine engine shaft horsepower and specific fuel consumption (which is the rate of fuel consumption per unit of power output) can be improved by increasing turbine inlet temperatures. However, current turbines are limited in inlet temperature by the physical properties of their materials. To permit turbines to operate at gas stream temperatures which are higher than the materials can normally tolerate, considerable effort has been devoted to the development of sophisticated methods of turbine cooling. In early gas turbine engine designs, cooling of high temperature components was limited to transferring heat to lower temperature parts by the method of conduction, and air-cooling technology was limited to passing relatively cool air across the face of the turbine rotor disks. In order to take advantage of the potential performance improvements associated with higher turbine inlet temperatures, modern turbine cooling technology utilizes air-cooled hollow turbine nozzle vanes and blades to permit operation at inlet gas temperatures in excess of 2000° F. (1094° C.). Various techniques have been devised to cool these hollow blades and vanes. These incorporate two basic forms of air cooling, either singly or in combination, depending upon the level of gas temperatures encountered and the degree of sophistication permissible. These basic forms of air cooling are known as convection and film cooling. U.S. Pat. Nos. 3,700,348 and 3,715,170, assigned to the assignee of the present invention, are excellent examples of advanced turbine air-cooling technology incorporating these basic air-cooling forms. However, the benefits obtained from sophisticated air-cooling techniques are at least partially offset by the extraction of the necessary cooling air from the propulsive cycle. For example, probably the most popular turbine coolant today is air which is bled off the compressor portion of the gas turbine engine and is routed to the hollow interior of the turbine blades. The compressor air, having a temperature much less than that of the turbine flow path gas stream, absorbs heat from the turbine blades to maintain the blades at an acceptable temperature. When this heated cooling air leaves the turbine blades, perhaps as a coolant film, this heat energy is lost to the propulsive cycle since the cooling air is normally mixed with the exhaust gases and ejected from an engine nozzle. More particularly, the air that is bled from the compressor and used as cooling air for the turbine rotor blades has had work done on it by the compressor. However, because it is normally reintroduced into the flow path gas stream downstream of the turbine nozzle, it does not return its full measure of work to the cycle as it expands through the turbine. Additionally, the reintroduction of cooling air into the gas stream produces a loss in gas stream total pressure. This is a result of the momentum mixing losses associated with injecting a relatively low total pressure cooling air into a high total pressure gas stream. The greater the amount of cooling air which is routed through the turbine blades, the greater the losses become on the propulsive cycle. Thus, while turbine blade cooling has inherent advantages, it also has associated therewith certain inherent disadvantages which are functions of the quantity of cooling air used in cooling the turbine rotor blades.

It will, therefore, be appreciated that engine performance can be increased by reducing the amount of cooling air required by the turbine rotor blades.

SUMMARY OF THE INVENTION

Accordingly, it is the primary object of the present invention to provide an aircraft gas turbine engine in which the turbine rotor blades are cooled to withstand the high temperature gases of combustion.

It is another object of the present invention to reduce the amount of cooling air required by the turbine rotor blades by reducing the temperature of the cooling air passing therethrough in order to improve cooling effectiveness.

It is another object of the present invention to provide an aircraft gas turbine engine wherein the work done by the compressor on that portion of the pressurized air used for turbine cooling is returned to the engine power cycle as useful energy.

These, and other objects and advantages, will be more clearly understood from the following detailed descriptions, the drawings and specific examples, all of which are intended to be typical of, rather than in any way limiting on, the scope of the present invention.

Briefly stated, the above objectives are attained in an aircraft gas turbine engine by providing a turbine wherein the rotor disk bears a plurality of hollow, air-cooled turbine blades. Cooling air is bled from the compressor portion of the engine and routed radially inwardly into a compact heat exchanger connected to and rotatable with the compressor. Heat which has been introduced into the cooling air through the compression process is extracted within the heat exchanger by engine lubricating oil which is routed through the heat exchanger and into heat exchange relationship with the cooling air. The cooled cooling air is then directed from the heat exchanger and through the turbine rotor blades to provide improved cooling thereof. The lubricating oil is that which performs the usual engine lubrication function so that an additional coolant need not be carried by the aircraft. Subsequently, this oil is cooled by engine fuel or the fan bypass stream airflow (in a gas turbofan engine) in a stationary heat exchanger relatively remote from the turbine. The use of the fuel as the final heat sink results in a regenerative engine in that most of the heat removed from the compressed air is reintroduced into the engine cycle as heated engine fuel.

Incorporation of this heat exchanger (or cooling air cooler) into an aircraft gas turbine engine permits a reduction in the quantity of compressor air required for turbine rotor blade cooling and, thus, provides an improvement in engine performance. Conversely, an increase in blade life can be achieved by maintaining the original coolant flow rate but by reducing the temperature of the coolant, with essentially no further degradation in engine performance.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiments which are given by way of example with the accompanying drawings in which:

FIG. 1 is a partial cross-sectional view of an aircraft gas turbofan engine incorporating the subject invention and illustrating schematically the relationship of various engine systems;

FIG. 2 is an enlarged, fragmentary, cross-sectional view depicting the cooling system of the present invention in greater detail;

FIG. 3 is an enlarged, fragmentary section of the turbine cooling system depicting in more particularity the routing of pressurized coolant air into the rotary heat exchanger;

FIG. 4 is an enlarged, fragmentary, cross-sectional view taken along line 4—4 of FIG. 3 and depicts the internal construction of the heat exchanger of the present invention in greater particularity; and FIG. 5 is an enlarged, fragmentary, cross-sectional view taken along line 5—5 of FIG. 3 and depicts the construction of one end of the heat exchanger of the present invention in greater particularity.

DESCRIPTION OF THE PREFERRED EMBODIMENT

Referring to the drawings wherein like numerals correspond to like elements throughout, attention is first directed to FIG. 1 wherein an aircraft gas turbofan engine depicted generally at 10 and embodying the present invention is diagrammatically shown. While it is recognized that turbofan engines are, by now, well known in the art, a brief description of the operation of the engine will enhance appreciation of the interrelationship of the various components in light of the invention soon to be described. Basically, the engine may be considered as comprising generally a core engine 12, a fan assembly 14 including a stage of fan blades 16 (only one of which is shown for clarity), and a fan turbine 18 which is interconnected to the fan assembly 14 by rotatable shaft 20. The core engine 12 includes an axial flow compressor 22 having a rotor 24 bearing a plurality of rotatable blade rows 26 (rotors) and a compressor casing 28 bearing a plurality of stationary blade rows 30 (stators) interposed in alternating relationship with the rotor blade rows 26. Air enters inlet 32 and is initially compressed by fan assembly 14. A first portion of this compressed air enters the fan bypass duct 34 defined, in part, by core engine 12 and a circumscribing fan nacelle 36 and discharges through a fan nozzle (not shown). A second portion of the compressed air enters inlet 40, is further compressed by the axial flow compressor 22 and then is discharged to a combustor 42 where it is mixed with fuel, supplied through means, such as an aircraft fuel tank 44 and an engine fuel control 46 of a type well known in the art and responsive to pilot throttle inputs, and burned to provide high energy combustion gases which drive a core engine turbine rotor 48. Core engine turbine rotor 48 (the high pressure turbine) comprises a turbine disc 50 bearing a plurality of hollow turbine rotor blades 52 about its periphery, only one of which is shown for clarity, and drives, in turn, the compressor rotor 24 through interconnecting shaft 54 in the usual manner of a gas turbine engine. A stationary row of turbine nozzle vanes 56 orients the flow into the rotating turbine rotor blades. The hot gases of combustion then pass through and drive the fan turbine 18 which, in turn, drives the fan assembly 14. A propulsive force is thus obtained by the action of the fan assembly discharging air from the fan bypass duct 34 through a fan nozzle and by the discharge of combustion gases from a core engine nozzle, also not shown but of variety well known in the art.

Having thus described the basic gas turbofan engine, attention is now directed to FIG. 2 wherein a turbine cooling system, indicated generally at 62, is illustrated in greater particularity. Pressurized air from the compressor 24 is extracted through an opening 64 within the compressor inner flow path and impelled radially inwardly by a radial inflow impeller associated with one of the plurality of rotor disks 68 comprising the compressor rotor 24 (see FIG. 1). Impeller 66 is of a variety well known in the art and comprises but one example of a means for extracting a portion of the compressed air from the compressor. As illustrated in FIGS. 1 and 2, the pressurized air has been extracted behind the sixth stage rotor for means of example only. The precise location for extraction will be a function of the amount of pressurization required in any particular gas turbine engine to force the cooling air through the hollow turbine rotor blades 52. The extracted pressurized air is then routed forward, through means such as an annular duct 70, and into a novel compact rotary heat exchanger 72 which will now be described in greater particularity.

Heat exchanger 72 includes an outer, generally cylindrical shell 74 attached at its forward end to core compressor rotor 24 through flange connection 76 with forward stub shaft 78. The aft end of outer shell 74 is supported in its radial location by aft frustoconical support member 80 associated with core engine shaft 54 and rotatable therewith. An inner cylindrical shell 82, generally concentric about fan shaft 20 and within outer cylindrical shell 74, cooperates with outer shell 74 to form an annular passage 84 therebetween. Referring also to FIG. 4, a plurality of extruded tubes 86 are spaced circumferentially within annular passage 84 to form a ring. Each tube has associated therewith a plurality of laterally extending fins 88 which extend over substantially the entire axial length of the tube and a plurality of axially extending holes 90 (here four in number) extending through the interior thereof. Each tube 86 is attached as by welding or brazing between a forward and an aft bulkhead, 92 and 94, respectively. The assembly of tubes and bulkheads is free to move axially within outer shell 74 to compensate for the effects of thermal expansion. To this end, each tube 86 has associated therewith a plurality of spacers 96 which ride against the inner surface of outer shell 74 in sliding engagement. Additionally, the forward end of shell 82 is received in sliding engagement within an annular slot 98 formed within forward stub shaft 78 and the aft end of inner shell 82 is received within a cooperating annular slot 100 formed within aft bulkhead 94. Thus, inner shell 82 is free to thermally expand and contract. O-rings 101 between the forward end of inner shell 82 and forward bulkhead 92, and between the aft end of inner shell 82 and aft bulkhead 94, serve to contain fluids within the heat exchanger.

Heat exchanger 72 is concentric with fan shaft 20 and is located at the smallest possible diameter within compressor rotor 24 to produce a compact design having minimum weight, low stresses and reduced rotational balance problems. Referring now to FIG. 3, the pressurized air extracted from compressor 12 by radial inflow impeller 66 and routed forward through annular duct 70 enters the rotary heat exchanger 72 through a first inlet comprising, for example, a plurality of slots 102 formed within the forward end of outer shell 74 which are in fluid communication with the compressor. After passing through slots 102, the compressed air is turned rearwardly by a plurality of turning vanes 104 which comprise the forward portions of fins 88 (FIG. 4) associated with each tube 86. These vanes are fashioned by cutting a portion of fins 88 from their respective tubes, contouring them into the desired turning profile, and then brazing or welding them in place on their respective tubes. Thus, turning vanes 104 serve to guide the pressurized air rearwardly toward the turbine rotor through a plurality of air passages 106 formed between cooperating pairs of fins 88. The compressed air is then routed from the heat exchanger through means comprising an outlet such as annular passage 108 and thereafter enters a plurality of radially extending bore passages 110 within turbine disk 50 and into turbine blades 52. The structure and function of the turbine disk bore entry cooling system is described in greater particularity in U.S. Pat. No. 3,982,852 — Richard H. Andersen et al, which is assigned to the assignee of the present invention, and the disclosure of which is incorporated herein by reference.

The gas turbofan engine of FIGS. 1 and 2 is provided with an engine lubrication system of a variety exemplified by U.S. Pat. No. 3,844,110 — William Widlansky et al, which is assigned to the assignee of the present invention and the subject matter of which is incorporated herein by reference. In particular, engine lubricating oil is delivered to the interior of fan shaft 20 through a stationary oil supply tube 112. The lubricating oil is centrifuged radially outwardly by the rotation of fan shaft 20 and flows in the forward direction due to the expanding taper 114 of fan shaft 20 and into the heat exchanger through a second heat exchanger inlet comprising, for example, a plurality of radially extending holes 116 through the shaft. Thus, it becomes apparent that fan shaft 20 with holes 116 serves as a convenient means for routing oil from the lubrication system into the heat exchanger. Oil is prevented from flowing beyond the region of holes 116 by a radial dam 118 extending inwardly from the inner surface of shaft 20.

The oil flows through holes 116 by centrifugal pumping due to the shaft rotation and is delivered to the heat exchanger oil inlet collector 120. Oil inlet collector 120 includes a generally cylindrical section 122 concentric with fan shaft 20 and spaced therefrom to form an annular passage 124 therebetween and is attached to bulkhead 94 at 126 for rotation therewith. As is best depicted in FIG. 5, the forward end of the oil inlet collector transits from cylindrical section 122 into a plurality of alternating chutes 128, 130, defined by generally corrugated walls 132 which comprise an axial extension of cylindrical section 122. Chutes 128 comprise a plurality of equally spaced oil inlet passages which serve to direct the lubricating oil from annulus 124 into the small axially extending holes 90 in extruded tubes 86 (FIG. 4). The alternating chutes 130 are in fluid communication with air passages 106 between extruded tubes 86 and are separated from oil chutes 128 by walls 132. Centrifugal pumping action forces oil into chutes 128 and through axially extending holes 90 in a direction opposite to the airflow through passages 106. Thus, the relatively cool lubricating oil and the relatively hot compressor bleed air are placed in heat exchange relationship within heat exchanger 72, with heat from the air being conducted through fins 88 into the relatively cool lubricating oil. Naturally, as the two fluids pass through the heat exchanger in heat exchange relationship, the oil increases in temperature and the compressor bleed air becomes cooler.

Referring again to FIGS. 2 and 4, oil holes 90 extend axially through forward bulkhead 92 and into an annular cavity 134 formed within the upstream end of bulkhead 92. Extending partially into cavity 134 is a ring-like dam 136 associated with forward stub shaft 78 and which is provided to assure that the lubricating oil flows fully through all axially extending holes 90 and not only the holes located at the larger diameter. The oil flows over dam 136 at orifice 138 and through holes 140 in the forward stub shaft 78. Thereafter, the oil is slung radially outwardly onto a stationary collector 142. Stationary baffle 144 prevents the heated oil from entering the area associated with the thrust bearing 146 between the rotating stub shaft 78 and stationary support structure 148. Heated oil from the heat exchanger is then mixed with the returning oil from the bearing sumps and scavenged in the normal manner. A series of small, axially extending slots 150 at the juncture of dam 136 and bulkhead 92 permits oil to drain from the heat exchanger upon engine shutdown, thus preventing oil coking during periods of no flow.

A pair of windback seals 152, 154 associated with inlet collector 120 discourage oil from escaping from annulus 124. However, in the event that oil bypasses the windback seals, it will merely flow either aft into the rear bearing sump area 156 to be scavenged along with the bearing oil, or it will flow forward along heat exchanger inner shell 82 and through a plurality of slots 158 formed in the forward end of the inner shell at its juncture with forward annular slot 98 within stub shaft 78. The oil will then flow through holes 140 in the forward stub shaft to be mixed with the oil flowing out of the heat exchanger. In either event, the leakage of oil through the windback seals 152, 154 presents no problems.

In the unlikely event of an oil leak developing in the heat exchanger, oil from tubes 86 would be centrifuged radially outwardly against the inside of outer shell 74. Centrifugal force would direct the escaping oil forward along inclined ramp 160 and through a plurality of tapered holes 162 in the forward stub shaft 78, thus preventing the oil from entering the annular cavity 164 between compressor rotor 24, core engine shaft 54, and turbine 48, which contains heat exchanger 72, where it could present a fire hazard. Oil is prevented from leaking back into annular air duct 70 by means of a lip 165 extending radially inwardly from outer shell 74 about each of the plurality of slots 102. Therefore, oil flowing along the inner surface of outer shell 74 would bypass holes 102 due to the presence of lips 165 and flow forward through holes 162.

Thus, in operation, relatively warm air is extracted from the compressor through radial inflow impeller 66, directed through annular duct 70 and into heat exchanger 72 through slots 102. Once inside heat exchanger 72, the heated air is pumped rearwardly through air passages 106 between tubes 86 and thereafter passes through alternating chutes 130 and into cylindrical section 122 which communicates with the hollow interior of turbine disk 50. Relatively cool engine oil is pumped by pump 167 through conduit 169 from oil tank 172 to the stationary injection nozzle 112 where it subsequently is delivered to the interior of shaft 20. After entering heat exchanger 74 through holes 116 it is pumped through holes 90 in extruded tubes 86 in counterflow relationship to a relatively hot compressor bleed air. Heat exchange takes place between the counterflowing fluids, with the heated engine oil eventually being mixed with the returning oil from the bearing sumps and scavenged in the normal manner. In order to recover the heat removed from the compressor rotor bleed air and to return it to the engine propulsive cycle, thus improving overall engine performance, the scavenged lubricating oil is subsequently directed via means such as conduit 166 and pump 168, shown schematically in FIG. 1, from the bearing sump area to a second heat exchanger 170 wherein the oil and fuel to be burned in combustor 42 are maintained in heat exchange relationship. The cooled oil is then routed back to an oil tank 172 via conduit 174. Conduit 176 comprises means for communicating between the fuel supply tank 44 and heat exchanger 170, and conduits 178 and 180 comprise means for routing the heated fuel to combustor 42. Thus, at least a portion of the heat absorbed by the turbine blades is reintroduced back into the power cycle as heated fuel. The present concept of utilizing two heat exchangers, air-oil heat exchanger 72 and oil-fuel heat exchanger 170, has an important advantage over prior art regenerative cooling systems in that the fuel is maintained at a substantial distance from the hot turbine rotor section, thereby reducing the risk of serious fire in the event of leakage. Furthermore, the blade coolant, air, presents no fire hazard whatsoever.

It will also be appreciated that alternative embodiments may be employed for cooling the heated lubricating oil. Whereas FIG. 1 teaches the use of an oil-fuel heat exchanger 170 to recover most of the heat removed from the compressor bleed air and to return it to the engine cycle as heated fuel, in the manner of a regenerative engine, it may be satisfactory in some applications to eliminate the regenerative feature, thereby simplifying the overall engine system. Gas turbofan engines are particularly well suited for the adaptation of a radiator in the fan bypass duct 34 to remove heat from the oil by placing it in heat exchange relationship with the fan bypass air flow stream. Such oil coolers are well known in the art and are readily adaptable to the subject of the present invention. In such an embodiment, however, the heat would be partially lost from the propulsive cycle. Thus, it is preferable to use the regenerative system depicted schematically in FIG. 1 wherever practical.

It has now become apparent that the turbine blade cooling system described herein offers many advantages over prior art systems. For example, the air-oil heat exchanger 72 has been designed and placed in the engine in such a manner that it does not substantially change the configuration or design of nearby structure since it is located in an area which is otherwise vacant. Because it is located at a lowest possible diameter, the design is compact, lightweight and void of high stresses. Additionally, the present invention employs state-of-the-art turbine disks and a common, safe, on-board secondary coolant (oil) is used. The more volatile fuel coolant is divorced from the hot turbine rotor structure. The system may employ conventional manufacturing techniques with relatively low-cost, long-life turbine blades. Reliance is placed upon the well-established concept of utilizing compressor bleed air as a turbine blade coolant; however, the amount of compressor bleed air required has been substantially reduced, thereby enhancing overall cycle performance. The low diameter heat exchanger design is ideal for bringing the cooled bleed air into the bore of a high-speed turbine rotor disk. Additionally, the system can be the basis for regenerative engines with resultant decreases in engine specific fuel consumption. Finally, means are provided to preclude the leakage of engine lubricants from the heat exchanger into the compressor and turbine rotor cavities where it could present the hazard of fire.

It should become obvious to one skilled in the art that certain changes can be made to the above-described invention without departing from the broad inventive concepts thereof. For example, while the present invention has been depicted as an integral part of a gas turbofan engine, it will become apparent to those skilled in the art that the present invention is equally applicable to engines of the gas turbojet variety, gas turbofan engines having three or more spools, or marine and industrial gas turbines. It is intended that the appended claims cover all such variations in the present invention's broader inventive concepts.

Having thus described the invention, what is claimed as novel and desired to be secured by Letters Patent of the United States is:

1. A gas turbine engine comprising a compressor for pressurizing air, a turbine having blades of the air-cooled variety, an engine lubrication system, and a heat exchanger rotatable with said compressor and having a first inlet in fluid communication with said compressor for receiving pressurized air therefrom, a second inlet in fluid communication with said lubrication system for receiving lubricant therefrom and an outlet for said pressurized air in fluid communication with said turbine blades.

2. A system for cooling a turbine of a gas turbine engine having a compressor for pressurizing air and a lubrication system comprising:
   means for extracting a portion of the compressed air from the compressor;
   a heat exchanger connected to and rotatable with said compressor and turbine;
   means for routing the extracted portion of air into said heat exchanger;
   means for routing lubricant from said lubrication system into said heat exchanger wherein it is placed in heat exchange relationship with said extracted portion of air; and
   means for routing said extracted portion of air from said heat exchanger and into said turbine.

3. A gas turbine engine comprising a compressor for pressurizing air; a turbine; a shaft drivingly connecting said compressor and turbine; a lubrication system; an internal cavity defined in part by said compressor, said shaft and said turbine; and a first heat exchanger rotatable with said compressor and turbine disposed within said cavity, said first heat exchanger being in fluid communication with said compressor for receiving a portion of heated compressed air therefrom and with said lubrication system for receiving a relatively cool lubricant therefrom, said air and said lubricant being placed in heat exchange relationship within said first heat exchanger, thereby heating said lubricant and cooling said air.

4. The gas turbine engine as recited in claim 3 wherein said first heat exchanger comprises a pair of generally concentric inner and outer shells defining an annulus therebetween; and a plurality of hollow finned tubes spaced circumferentially about said annulus and wherein the extracted portion of air is routed through said annulus between said tubes and the lubricant is routed through the hollow interior of said tubes.

5. The gas turbine engine as recited in claim 3 further comprising a combustor wherein pressurized air from said compressor is mixed with a fuel and combusted, a second heat exchanger, means for directing the heated lubricant from said first heat exchanger and through said second heat exchanger; means for serially routing fuel through said second heat exchanger and into said combustor, thereby heating said fuel prior to combustion.

6. A system for cooling a turbine of a gas turbine engine having a compressor for pressurizing air and a lubrication system, comprising:
   a radial inflow impeller rotatable with the compressor for extracting a portion of the compressed air therefrom;
   a heat exchanger having generally concentric inner and outer shells defining an annulus therebetween, a plurality of hollow finned tubes spaced circumferentially about the annulus, a pair of bulkheads extending between the inner and outer shells to support the tubes, and a generally annular duct surrounding the outer shells;
   means for routing the extracted portion of air through said generally annular duct and into the annular space between said tubes;
   means for routing lubricant from said lubrication system into said heat exchanger and through the hollow interior of said tubes; and
   means for routing said extracted portion of air from said heat exchanger and into said turbine.

7. The cooling system as recited in claim 6 wherein said annular duct is in fluid communication with the annulus between said inner and outer shells.

8. The cooling system as recited in claim 7 wherein each of said tubes includes a plurality of laterally projecting and longitudinally extending fins, one end of said fins being contoured to guide the flow of extracted air from said annular duct and through said outer shell into said heat exchanger.

9. A system for cooling a turbine of a gas turbine engine having a compressor for pressurizing air and a lubrication system, comprising:
   means for extracting a portion of the compressed air from the compressor;
   a heat exchanger having generally concentric inner and outer shells defining an annulus therebetween, a plurality of hollow finned tubes spaced circumferentially about the annulus, and a pair of bulkheads extending between the inner and outer shells to support the tubes;
   means for routing the extracted portion of air into said heat exchanger; and
   a collector having a generally corrugated wall defining a plurality of chutes, alternating chutes being in fluid communication with said lubrication system and the hollow interior of said tubes wherein the lubricant is placed in heat exchange relationship with the extracted portion of air, and the remaining chutes being in fluid communication with the annular space between tubes and said turbine to be cooled.

* * * * *